United States Patent [19]
Oh

[11] Patent Number: 5,710,592
[45] Date of Patent: Jan. 20, 1998

[54] DEVICE REALIZING 3-D PICTURE

[75] Inventor: Bong Whan Oh, Kyungki-Do, Rep. of Korea

[73] Assignee: Kasan Electronics Co., Ltd., Kyungki-do, Rep. of Korea

[21] Appl. No.: 546,914

[22] Filed: Oct. 23, 1995

[30] Foreign Application Priority Data

Oct. 29, 1994 [KR] Rep. of Korea .................. 94-28115

[51] Int. Cl.$^6$ ................ H04N 9/47; H04N 13/04
[52] U.S. Cl. ................................................. 348/56
[58] Field of Search ...................... 348/43, 56, 57, 348/51, 53, 54, 55, 58, 42, 558

[56] References Cited

U.S. PATENT DOCUMENTS 4,387,396  6/1983  Tanaka et al. .................. 348/42
4,837,626  6/1989  Nishiyama et al. ............. 348/558

*Primary Examiner*—Amelia Au
*Attorney, Agent, or Firm*—Drummond & Duckworth

[57] ABSTRACT

This invention relates to a device realizing 3-D picture. A device corresponding to the invention shuts a left or a right eye alternately according to horizontal or vertical synchronizing signal and maximally overlaps a closing delay time and an opening delay time, which are generated out of the shutting response characteristic of shutters, with vertical blank or horizontal blank. Therefore, the invention enhances the quality of 3-D picture by preventing a little loss in a frame of picture and by removing, in the sequential scanning mode, the flicking effect.

4 Claims, 5 Drawing Sheets

DEVICE REALIZING 3-D PICTURE

FILED OF THE INVENTION

This invention relates to a device realizing 3-D picture, in particular a device which makes planar video signal be seen as 3-dimensional picture by allowing an interlaced scanned image or a sequential scanned image to be exposed to our right or left eye alternatively according to vertical synchronizing signal, which is denoted as V-sync hereafter, or horizontal synchronizing signal, which is denoted as H-sync hereafter, of high frequency.

DESCRIPTION OF THE PRIOR ART

As separating the signal carrying video information into right and left picture the prior art makes each of the divided pictures be exposed to eyes alternately with shutters. A fight shutter makes right eye not to see while the picture for left eye is being shown and left one makes left eye not to see while the picture for fight eye is being shown. The speed of operation for shutting pictures alternately is so relatively high that we can see a 3-dimensional screen without a flicking effect caused by afterimage phenomenon.

In the interlaced scanning mode, the frames of picture are divided into even and odd, which are composed of a lot of scanning lines, and then scanned one after the other. So only left eye is made to recognize even or odd frame for left eye with a right eye shut while even or odd frames are being scanned, and only fight eye is made to recognize the other frame for right eye with left eye shut while the other are being scanned. That method of prior art but it unexpectedly deteriorates resolution of screen by half. A shutting operation of shutters is synchronized with V-sync, so that switchover from left to right shutting or from right to left shutting begins on V-sync occurring.

However, the above-mentioned method has a few problems.

First, since the method synchronizes operation of shutters with only V-sync and does not use any specific signal to determine between left and fight frames it is difficult to correct shutting sequence once the sequence is reversed in order. For example, FIG. 1(a) and 1(b) show problems incurred by losing a V-sync and detecting an additional V-sync owing to noise. As shown in the FIGs, after occurrence($t_O$) of error in detection of V-sync there continues the state($L_{VT}$) that a scanning sequence of left and right frames have been against shutting sequence of shutters, so that the shutters will shut eyes periodically contrary to the normal sequence (LR).

Therefore, a observer needs means to manually correct the wrong shutting sequence. However, after correction of sequence the displaying sequence of left and right frames changes again if an error shown in FIG. 1(a) or 1(b) occurs.

Secondly, liquid crystal shutters, and polarized film are attached to their two sides, are generally used as shutters. However they have a problem of shutting response characteristic. As shown is FIG. 2, since liquid crystal shutters have shutting response characteristic that is denoted as "R" therein they can not immediately shut light from screen when an input voltage(V) is applied. Assuming that the input voltage is being applied from $t_O$ to $t_2$, a closing delay time($t_{ON}$), which is from the point of time($t_0$) when input voltage is applied to the point of time($t_1$) when substantial shutting operation has been completed, occurs and an opening delay time($t_{OFF}$), which is from the point of time($t_2$) when a rectangular waveform input is removed to the point of time($t_3$) when either of shutters is substantially opened to the light, does too. Therefore it is impossible to realize 3-dimensional pictures during each of the two of delay time, $t_{ON}$ and $t_{OFF}$, if both of the delay time overlap with the time for pictures to be displayed onto screen. Other shutting means not using liquid crystal has the same problem that is explained above in details.

Thirdly, since the V-sync has 60 Hz frequency in the interlaced scanning mode the left and right shutter become to repeat shutting and opening operation at 30 Hz. However this frequency is so low that unwanted flicking effect occurs and accordingly fatigues observer's eyes easily as time goes by.

SUMMARY OF THE INVENTION

It is accordingly the object of the present invention to provide a device realizing 3-dimensional picture which has improved functions. One of these functions is to use H-sync as well as V-sync to tell which eye is shut and to minimize the time for which the left and right frames are wrongly exposed to eyes due to reversed sequence. Another of these functions is to remove problem brought about by shutting response characteristic of shutters or to minimize the effect of the problem. And another is to make much shorter the period that the left and right shutter operate to shut and transmit light and then to remove the flicking effect.

In order to achieve the said object and to implement the said functions, the present invention detects V-sync and H-sync, calculating phase difference between the two signals and judges by the phase difference whether the first H-sync after V-sync is for even or odd line in the interlaced scanning mode. According to the judgment, shutters of the present invention shut left or right eye and maintain the shut state of either until next V-sync is detected. Furthermore, the closing delay time($t_{ON}$) and the opening delay time($t_{OFF}$) are intended to be desirably located within a vertical blank time which starts a little before a V-sync and ends a little after.

In the sequential scanning mode, the shutters of the present invention shut left or right eye be unable to see a scanned line of pictures for the other eye, maintaining the shut state of either until next H-sync is detected. When it is detected, the invention commands that a shutter, if shut, be released from the shut state and that the other shutter, which is in released state, shut an eye corresponding to itself. After detecting V-sync to initialize shutting operation of shutters this invention always makes a predetermined shutter shut an eye of the two. Furthermore, the closing delay time($t_{ON}$) and the opening delay time($t_{OFF}$) are intended to be maximally overlapped with horizontal blank time.

Using the facts that in the interlaced scanning mode there is a difference between phase of even H-sync(HE) and phase of odd H-sync(HO), which are calculated from V-sync(VS), as shown in FIG. 3 and that in the sequential scanning mode even line is always scanned after a V-sync, even if an error occurs in detecting V-sync to be used in commanding either of shutters to shut an eye this invention corrects immediately the shutting sequence of shutters as soon as the first V-sync after occurrence of the error is detected In order to minimize a period of shutting or opening operation of shutters in the sequential scanning mode, the shutters is made to operate in accordance with H-syncs. That is, whenever the even and the odd H-syncs are detected this invention has shutters shut left or right eye alternately.

DETAILED DESCRIPTION OF THE INVENTION

A better understanding of the invention will be obtained by referring to the accompanying drawings.

Figure 3:
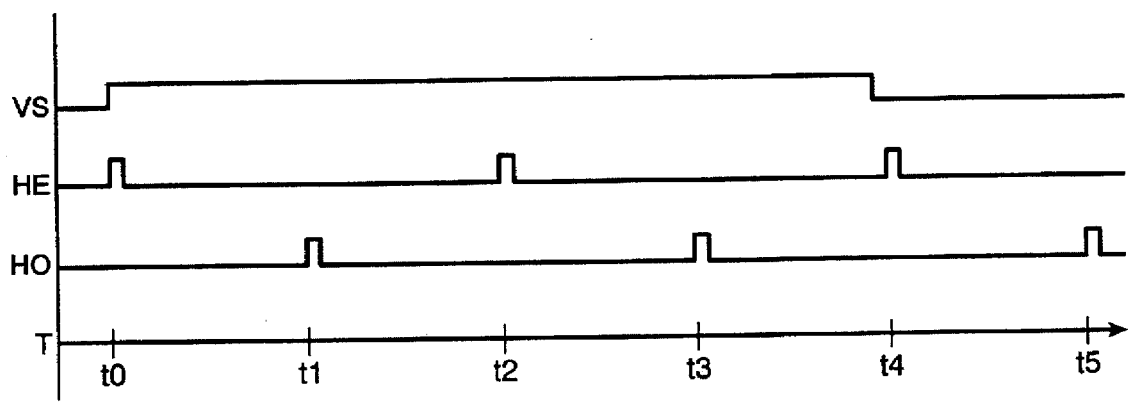
FIG. 3 shows synchronizing signals in the interlaced scanning mode.

As shown in FIG. 3, in the interlaced scanning mode, we can see that scanning mode the phase of H-sync for the first even line is different from that for H-sync of the first odd line when H-syncs are illustrated with respect to V-sync. The detected phase difference in the part receiving 3-dimensional video signal, the invention considers the H-sync as even if its phase is equal to that of V-sync and then shuts, for example, right eye for the time of one frame and the other side considers the H-sync as odd if its phase is not equal and then shuts, for example, left eye. Therefore, the invention can amend correctly, if has reversed, the sequence to shut eyes whenever V-syncs occur.

Figure 4:
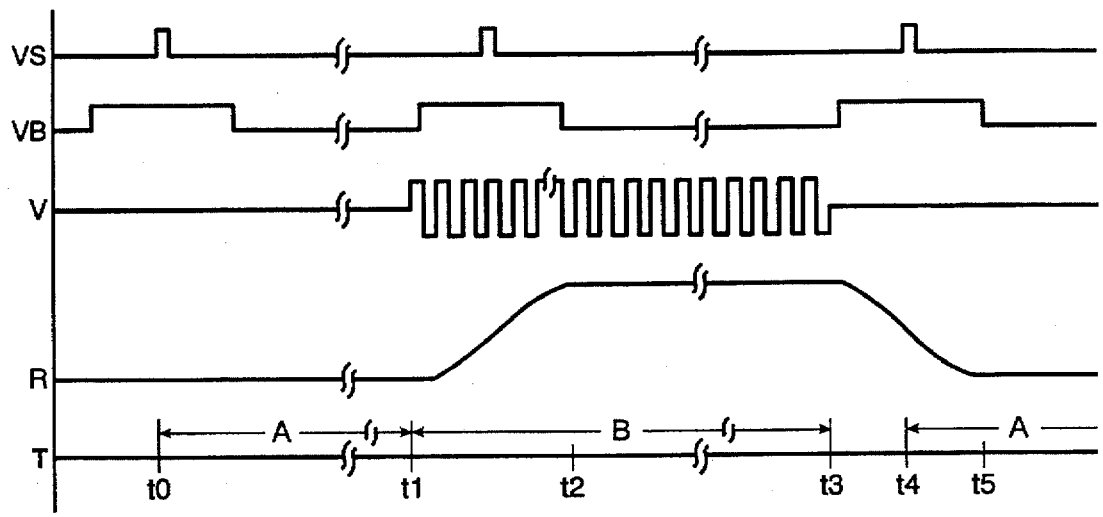
FIG. 4 shows time relation between V-sync and response characteristic of shutter obtained from the present invention.

Furthermore, the device corresponding to this invention uses the delay shutting method that allows the closing and the opening delay time($t_{ON}, t_{OFF}$) to be located within a vertical blank time(VB) for which the lines being scanned are not shown to our eyes. To determine accurately location of both of delay time, the adjustment of two parameters is used as shown in FIG. 4 where "T", "VS", "VB", "V" and "R" are time, V-sync, vertical blank, voltage applied to shutters and shutting response characteristic respectively.

The delay shutting method establishes a first delay time (A) after detection of beginning point($t_o$) of V-sync and a second delay time(B) after the expiration of the first delay time(A), and has been applying a shutting voltage(V) to appropriate shutter for the second delay time(B). If the shutting voltage(V) is applied the shutting operation begins, however an absolute shutting effect comes out after the closing delay time($t_{ON}$) elapses. Thus the point of time when the operation of shutting begins is adjustable by the length of "A", so that the point of time when the absolute shutting effect comes out becomes to be adjustable by that, too.

Therefore, the closing delay time($t_{ON}$) is sure to be located within a vertical blank(VB) by means of adjustment of the length of "A". It is desirable for the whole time of "$t_{ON}$" to be located within a vertical blank time(VB) in order to remove the defect of pictures caused by delay of the shutting response characteristic. The said principle is used to determine the length of "B" in order that the opening delay time($t_{OFF}$) may overlap with vertical blank(VB). It is also desirable for the whole time of "$t_{OFF}$" to be located within a vertical blank time(VB) just as in "$t_{ON}$".

Figure 5:
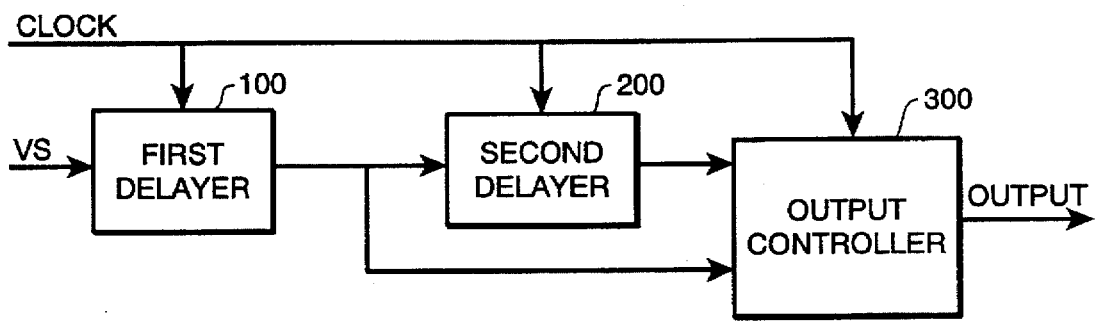
FIG. 5 is a block diagram implementing an algorithm to shut eyes with delay corresponding to this invention.

FIG. 5, which is a block diagram to have embodied the basic concept of the delay shutting method, comprises a first delayer(100), a second delayer(200) and an output controller (300). A clock, periodic pulses with a constant period, is used to delay and output signals.

If the first delayer(100) acknowledges a V-sync(VS) it outputs a signal after delay of a length of "A" and if the second delayer(200) acknowledges the signal from the first delayer(100) it outputs a signal after delay of a length of "B". The second delayer(200) is almost same as the first delayer(100) in the scheme without considering inputs applied to two delayers. The output controller(300) receives the signals from two delayers and generates necessary waveform after expiration of delay "A".

In the sequential scanning mode, the device corresponding to the present invention uses H-syncs instead of V-syncs and synchronizes the shutting operation of shutters with H-syncs. In this mode, a method which is similar to that used in the interlaced scanning mode is also used to overlap the closing delay time($t_{ON}$) and the opening delay time($t_{OFF}$) maximally with horizontal blank time(HB). Besides, the clock in FIG.5 is replaced by a clock with higher frequency suitable to H-syncs. The device has both of shutters operate alternately according to H-syncs after the operation to shut eyes is initialized by a V-sync in this mode.

Figure 6:
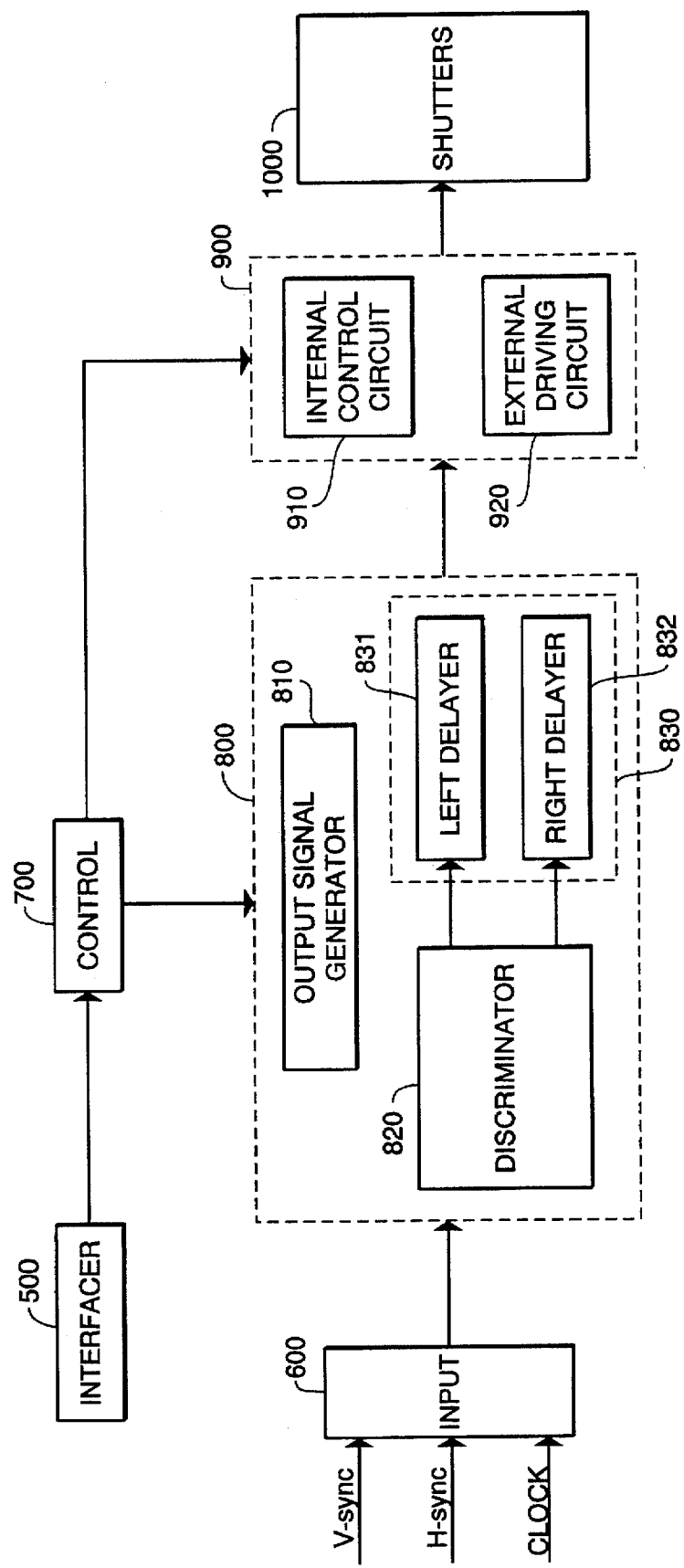
FIG. 6 is a block diagram of overall device corresponding to this invention.

FIG. 6, which is an overall block diagram to represent the device corresponding to this invention, comprises a interfacer(500), an input part(600), a control part(700), an operating part(800), an output part(900) and shutters(1000). The interfacer(500) interfaces the control part(700) with a computer. And the input part(600) receives V-syncs, H-syncs and a clock with, for example, 14.31818 Mhz frequency, transmitting these signals, which are used in internal circuits, to the operating part(800) after having stabilized them. The control part(700), which controls all functions of the operating part(800) and the output part(900), is composed by 10 units of 8-bit registers of which contents determine a form of input, a mode of operation and a form of output.

The operating part(800), which commands shutters to close or open according to V-syncs or H-syncs on the basis of the values of input and controlling status, comprises a generator of output signal(810), a discriminator(820), a left delayer(831) and a right delayer(832). The generator of output signal(810), which is installed to generate a rectangular waveform when liquid crystal is selected as shutter, includes a divider that divides clock by the value from the control part(700). The discriminator(820) receives V-syncs and/or H-syncs and output signals to tell which shutter is to be shut. And, on the basis of the control value that can select one among discriminating modes that include a V-sync mode, which uses only V-sync to discriminate between left and right frame, a phase difference mode, which uses the phase difference of H-syncs, and an even/odd mode, which uses the binary input signals, "1" or "0". The left delayer (831) and the right delayer(832) are much the same in circuit and both of them include a 12-bit divider and a comparator. A delay part(830), which is composed of the left delayer (831) and the right delayer(832), begins to count H-syncs on detecting signal from the discriminator(820) and the first delayer(100) outputs a signal when the counted value becomes equal to the delay value of "A" sent from the control part(700). Identically, the second delayer(200) begins to count H-syncs on detecting the signal from the first delayer(100) and the delay part(830) is initialized to repeat the said operation when the counted value becomes equal to the delay value of "B" sent from the control part(700). The delay part(830) of which total delay time is determined by "A" and "B" chosen by the control part(700) maintains its output of a logical value "1" from an ending point of the delay time "A", i.e., a starting point of the delay time "B" till an ending point of the delay time "B".

The output part(900), which includes an internal control circuit(910) and an external driving circuit(920), outputs signal which is necessary to operation of shutters after combining the output from the delay part(830) with the rectangular waveform from the generator of output signal (810). The external driving circuit(920) is controlled by a signal, which is selected according to the type of installed shutters, sent from the control part(700). The shutters usually adopt a liquid crystal method, a wireless receiving method, or a strong dielectric liquid crystal method, etc. In case that a general liquid crystal shutters is adopted, the external driving circuit(920) is composed of operational amplifiers and other components and after amplifying signal from the operating part(800) it applies voltage to shutters and drives them. Adoption of strong dielectric liquid crystal shutters makes the structure of the external driving circuit (920) not less simple than that of general liquid crystal shutters does.

Figure 7:
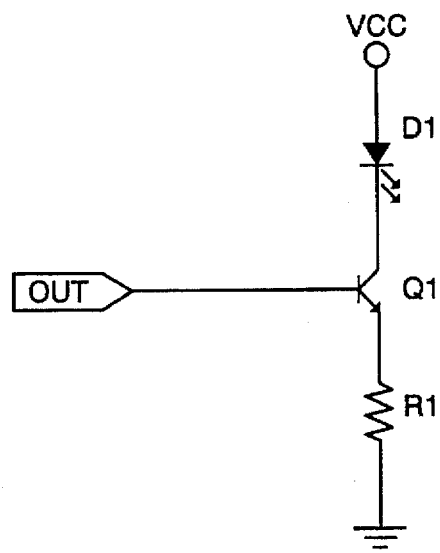
FIG. 7 is a circuit diagram of output part to transmit signal wirelessly.

FIG. 7 shows a wireless transmitting circuit of the output part(900) which is used when wireless receiving shutters is selected as part of the invention. In order to obtain the modulated signal according to internal control status the external driving circuit(920) is composed of a transistor (Q1), a infrared rays emitting diode for outputting signal, and a resistor.

Hereafter, the function and effect of the invention which is implemented as illustrated above will be explained.

Figure 1A:
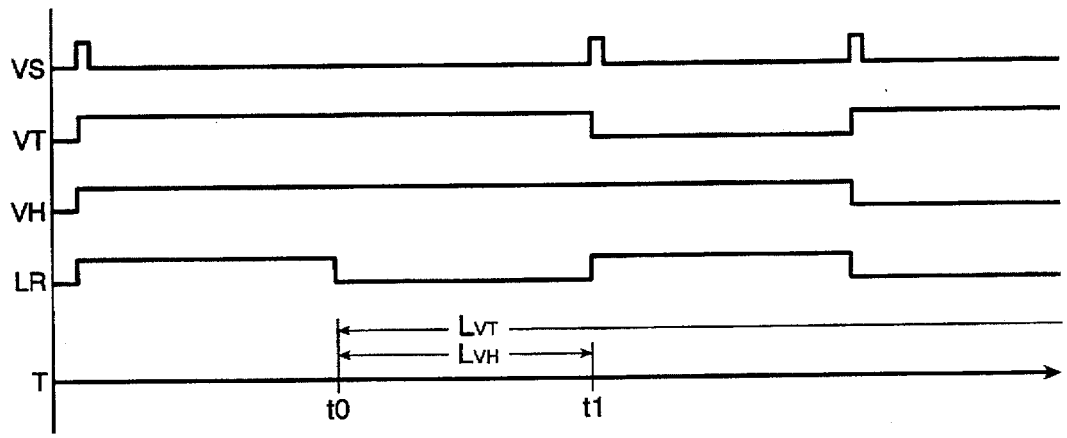
FIG. 1(a) shows an operation to discriminate between right and left frames when losing a V-sync.
Figure 1B:
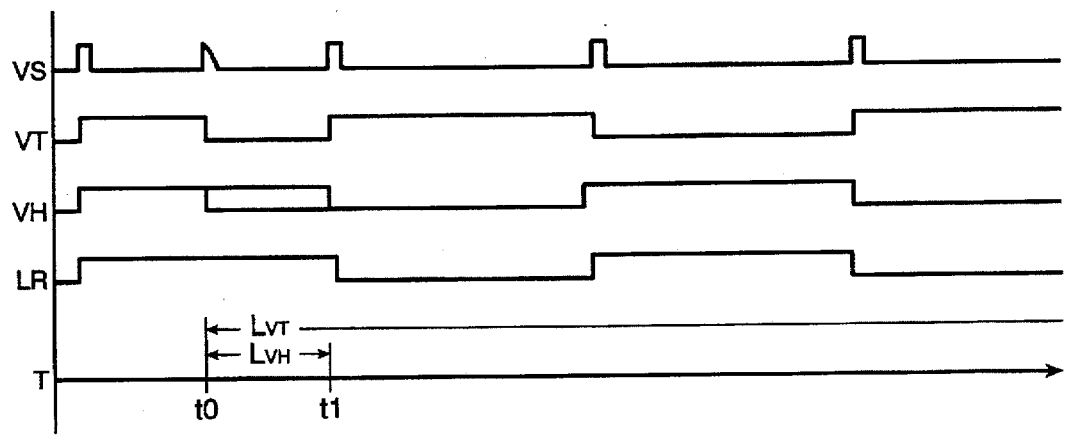
FIG. 1(b) shows an operation to discriminate between right and left frames in case of unexpected additional detection of a V-sync.
Figure 2:
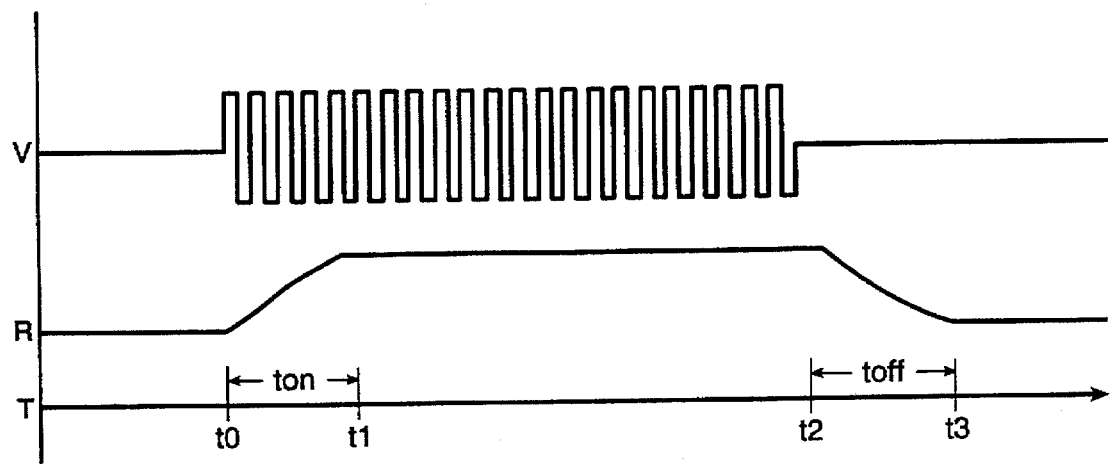
FIG. 2 is response characteristic of liquid crystal shutter.

FIG. 1(a) and 1(b) show the malfunctioning timing chart, which is caused by failure in detecting V-sync, of shutters to compare function of this invention with that of prior art. FIG. 1(a) shows the case that a V-sync is lost because of failure in detecting V-sync and FIG. 1(b) shows the case that an additional detection of V-sync occurs at to because of unwanted noise. Like said explanation, once a left and a right shutter are reversed in sequence to shut eyes the reversed sequence continues for time $L_{VT}$ in the prior art that uses method discriminating between left and right frames by only V-sync, however even if left and right shutter are reversed in sequence the reversed sequence continues for very short time $L_{VH}$ in this invention because the wrong sequence is immediately corrected by discriminating frames again and again with a phase of H-sync at $t_1$ whenever V-sync occurs.

In the sequential scanning mode, whenever a new frame of picture begins to be scanned the reversed sequence can be immediately corrected easily too because the first H-sync is always for even line.

Figure 8:
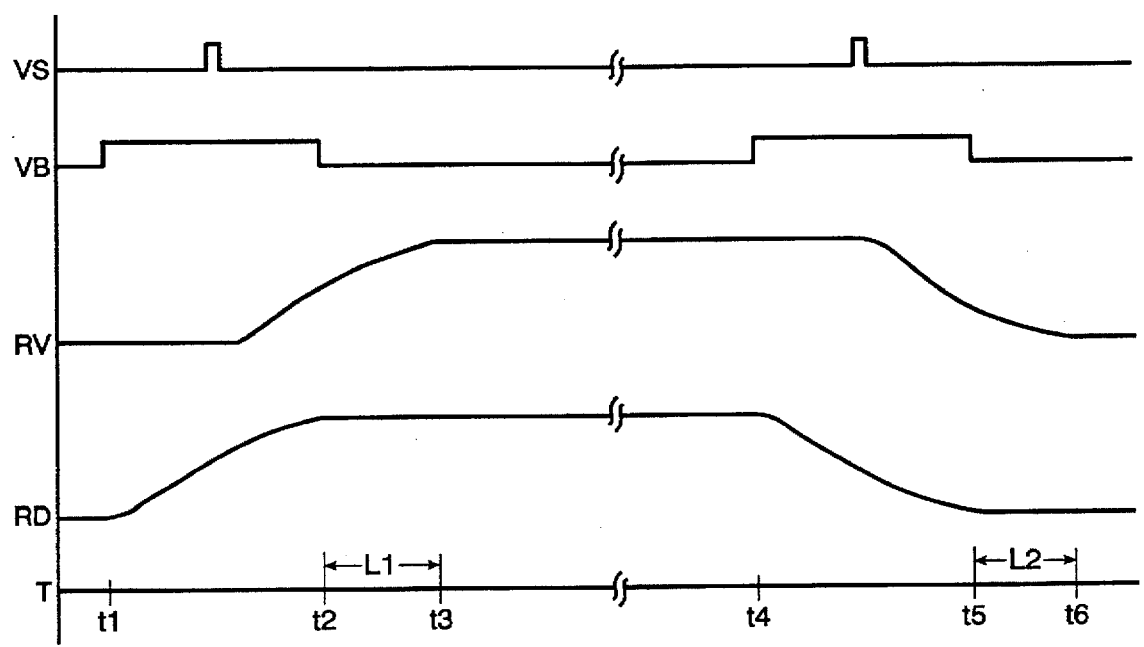
FIG. 8 compares performance of this invention with that of the prior when they are responding to V-sync.

FIG. 8 compares the shutting method(RD) of this invention with the conventional shutting method(RV) in the shutting operation according to V-sync. In the conventional shutting method(RV), a front loss time(L1) in a frame of picture, which begins at $t_1$ and ends at $t_2$, occurs since a shutting operation starts at $t_2$ in vertical blank and ends at $t_3$, which is in the time during which pure video signals is displayed onto screen. Further, a back loss time(L2) in a frame of picture also occurs when shut state is released. In the shutting method of this invention, however, there is no such loss time in a frame of picture since a closing and an opening delay time are located within a vertical blank time.

Additionally, this invention is sure to make the operational frequency of shutters higher by commanding shutters to shut or open eyes according to H-syncs in the sequential scanning mode, so that the flicking effect is perfectly removed and therefore observer's eyes feel comfortable even if they are exposed to 3-dimensional picture for a long time.

What is claimed is:

1. A device realizing 3-D picture in the interlaced scanning mode, comprising:

means for detecting starting points of horizontal synchronizing signals and vertical synchronizing signal;

means for calculating a phase difference between the horizontal and vertical synchronizing signals and then discriminating between odd and even lines according to the calculated phase difference to produce a discriminated result;

means for shutting a left or a right eye according to the discriminated result and then maintaining the shut state until a next vertical synchronizing signal is detected.

2. A device as recited in claim 1, further comprising:

means for putting a closing delay time($t_{ON}$) and an opening delay time($t_{OFF}$) of shutters within a vertical blank time which is not displayed onto a screen.

3. A device realizing 3-D picture in the sequential scanning mode, comprising:

means for detecting a vertical synchronizing signal and then shutting a predetermined eye.

means for detecting horizontal synchronizing signal;

means for shutting alternatively a left and a right eye according to the detection of horizontal synchronizing signal and maintaining the shut state until a next horizontal synchronizing signal is detected.

4. A device as recited in claim 3, further comprising:

means for overlapping a closing delay time($t_{ON}$) and an opening delay time($t_{OFF}$) Of shutters with a horizontal blank time.

* * * * *